United States Patent [19]

Haynes et al.

[11] Patent Number: 4,479,922
[45] Date of Patent: Oct. 30, 1984

[54] SOLVENT TREATMENT IN THE SEPARATION OF PALLADIUM AND/OR GOLD FROM OTHER PLATINUM GROUP AND BASE METALS

[75] Inventors: Richard Haynes, East Windsor; Anna M. Jackson, Somerset County; Martin K. Zierold, Lakewood, all of N.J.

[73] Assignee: AT&T Technologies, Inc., New York, N.Y.

[21] Appl. No.: 482,077

[22] Filed: Apr. 4, 1983

[51] Int. Cl.$^3$ .................... C01G 55/00; C01G 7/00
[52] U.S. Cl. ................................. 423/22; 423/24; 75/101 BE
[58] Field of Search ............... 423/22, 24; 75/101 BE

[56] References Cited

U.S. PATENT DOCUMENTS 3,410,924 11/1968 Fasce .
3,767,760 10/1973 Hougen et al. .................. 423/22
3,985,552 10/1976 Edwards .......................... 423/22

Primary Examiner—Herbert T. Carter
Attorney, Agent, or Firm—J. F. Spivak

[57] ABSTRACT

We have discovered that by pretreating a thioether (R'—S—R) containing organic phase to be used as an extractant in a solvent extraction process for separating platinum group metals from base metals and/or each other in aqueous solution with a mild oxidant, e.g., cupric chloride, in an acidified aqueous phase, the tendency of stable emulsion formation during extraction can be substantially eliminated.

17 Claims, No Drawings

SOLVENT TREATMENT IN THE SEPARATION OF PALLADIUM AND/OR GOLD FROM OTHER PLATINUM GROUP AND BASE METALS

TECHNICAL FIELD

This invention relates to the separation of palladium and/or gold from other platinum group and base metals and/or from each other and particularly with a pretreatment of the solvent employed in such separation.

BACKGROUND OF THE INVENTION

Thioethers (organic sulfides) having the structure R'—S—R where R,R' may be alkyl, aryl, or arylalkyl and where any alkyl chain may be interrupted by an oxygen atom have long been known to form complexes with the transition group metals, especially with the metals of groups 8, 1b, and 2b. Several complexes of the form $MX_2(RSR')_2$ wherein X is a halide group have been described in the literature. Further, the affinity of the various metals for the R'—S—R group varies. For example, Ag, Zn, and divalent Cu ions form stronger halide complexes than do thioether complexes in aqueous media while monovalent Cu and divalent Hg have roughly equal ligand strengths for both the chloride and thioether complexes in aqueous media. In comparison to the above, the platinum group metals and gold form substantially stronger thioether complexes than do the corresponding chloro complexes.

Thus one could expect that thioethers could be employed to selectively complex the platinum group metals and gold in chloride media in the presence of other transition elements and that a solvent extractant or ion-exchange resin could be based on a thioether functional group to extract the platinum group metals and gold as a group. R. I. Edwards reports in U.S. Pat. No. 3,985,552 that such in fact is the case and ion-exchange resins with the active group —$CH_2$—S—$CH_3$ were employed and found to extract Pt, Pd, Au, Rh, and Ir from hydrochloric acid media. He also reports that di-n-octyl sulfide was found to extract only Pd and Au from hydrochloric acid media for this group of elements. Pt, Rh, Ru, and Ir was not extracted at all employing the di-n-octyl sulfide. He further found that while gold was extracted extremely quickly into the organic phase, palladium was extracted relatively slowly. This gave rise to the selectivity of solvent extraction of palladium and gold as well as gold from palladium utilizing the di-n-octyl sulfide or other thioether solvent extractants as reported in the aforementioned patent having the formula R'—S—R.

While the invention as set forth in U.S. Pat. No. 3,985,552, which patent is incorporated herein by reference, is useful for the separation of palladium and gold from base metals (i.e., any metal impurities other than palladium group metals or gold) as well as from other platinum group metals, practical use of the separation technique employing commercial grade thioethers has been found to be limited. In particular, if one wants to obtain a high purity ($\geq 99.95\%$) palladium and/or gold the method has not been suitable. The reason for this limitation is that, a problem exists during the stripping operation after solvent extraction in that while following the method as set forth in the patent, an emulsion which takes several hours to disassociate tends to form upon extraction. This emulsion in and of itself limits the practical use of the technique due to the time required for the emulsion to break up so as to allow phase separation. However, even when the macro-emulsion appears to be broken and two phases formed, a micro-emulsion remains dispersed within the two phases which carries impurity ions along with it causing contamination and loss of solvent.

We have now discovered the cause of the emulsion formation and an improved method of extracting palladium and/or gold from base metals employing the thioether extractants which includes a step of treating the thioether prior to extraction of the palladium and/or gold so as to prevent the formation of a stable emulsion by removing the emulsion causing constituent from the thioether.

SUMMARY OF THE INVENTION

A solvent extraction method for separating platinum group metal ions from other metal ions and/or from each other including the steps of mixing an aqueous acidic chloride solution containing the metal ions to be extracted with a water immiscible organic phase which includes an organic extractant comprising a thioether having the formula R'—S—R wherein R' and R are organic radicals of the same or different types having a carbon atom bonded to the sulphur (S) atom and separating the aqueous phase from the organic phase, including the step of treating said water immiscible organic phase prior to mixing said phase with the aqueous phase, with an oxidizing agent capable of essentially eliminating any impurity in the organic phase of the type R-S-H wherein R is an organic radical, S is sulphur and H is hydrogen, said oxidizing agent being incapable of oxidizing the thioether.

DETAILED DESCRIPTION

During the course of studying the extraction of platinum group metals and in particular palladium and/or gold from base metals and/or other platinum group metals employing a thioether extractant of the type taught in U.S. Pat. No. 3,985,552 which is incorporated herein by reference, it was found that a fairly stable emulsion developed during the extraction process which took many hours to apparently break up such that the organic and aqueous phases can be separated. Further, even after apparently breaking up, a micro-emulsion or colloidal phase evidently still existed which carried with it impurities which remained with the metals to be extracted even after stripping said metals from the organic phase after initial extraction. This effect limited the degree of purification obtainable by the thioether solvent extraction technique. We discovered that by treating the thioether extractant in the organic phase with a mild oxidant prior to the extraction procedure, the formation of the stable emulsion is essentially eliminated as well as the resultant carry-over of impurities and solvent loss observed when such an emulsion exists.

Our investigation has led us to believe that the cause of emulsion formation is the presence of small quantities of a mercaptan impurity of the type R-S-H in the thioether extractant which extractant has the formula R'—S—R wherein R' and R are organic radicals of the same or different types having a carbon atom which is linked to the sulphur (S) atom as set forth in the formula. H represents a hydrogen atom. It appears that the commercially available thioether extractant generally contains as much as 0.2% or more of the impurity of the type R—S—H. Even vacuum distilled high purity thioethers which for practical purposes are cost prohibited for use in the commercial purification of the precious metals contain small amounts of such impurities. Subsequent to treatment with a mild oxiding agent as set forth herein, the amount of R—S—H type impurity is reduced to below 0.00%.

While the process is not limited by the following explanation, it is believed that the oxidant reacts with the R—S—H in an oxidation-reduction reaction so as to remove the hydrogen from the R—S—H leaving a free radical R—S which then combines with a second R—S to form a disulfide, R—S—S—R. This resultant product does not react with the metal ions to be extracted or the base metals nor does its presence cause an emulsion. It should be obvious to one skilled in the art that the oxidant that is used must be a mild oxidant which does not react with or decompose the thioether extractant or any solvent of the organic phase.

Generally, the oxidizing agent which is used for treating the organic phase is in an aqueous solution which is mixed with and then separated from the organic phase. Preferred oxiding agents are metals which exhibit more than one oxidation state and whose higher valence states are capable of entering into a redox reaction with the mercaptan R—S—H. In addition, the metal ion used should be one which preferably does not form a stable complex with the thioether in comparison to any chloro complex or to its solubility in aqueous solution. Examples of such suitable ions are the cupric, ferric, and stannic ions. These ions may be used in acidic aqueous solutions either alone or as mixtures. The cupric ion appears to be preferred. In use, the aqueous oxidizing agent should preferably be in a somewhat acidic media so as to prevent formation of any insoluble hydroxides. Also, since extraction of the platinum group metals takes place from a chloride solution it is further preferred that the oxidizing ion be in the form of its chloride and in a somewhat acidic solution acidified with hydrochloric acid.

In the preferred embodiment, after mixing the organic phase with the aqueous oxidizing agent and separating the phases, it is preferred to then mix the organic phase with ammonium hydroxide followed by neutralization of any ammonium hydroxide in the organic phase by treating the organic phase with a dilute solution of hydrochloric acid. It is believed that the ammonium hydroxide treatment strips any of the metal ions which may tend to stay behind in the organic phase during the oxidizing step from the organic phase. While this step is not necessary for the removal of the RSH impurity, it is preferred so as to insure that no metallic impurity is added to the organic phase.

The pretreated organic extractant phase may then be utilized as set forth in U.S. Pat. No. 3,985,552 for the separation and extraction of the platinum group metals and gold. Further, the selectivity as set forth in that patent for the separation of gold and palladium from other platinum group metals or from each other can also be employed. As set forth therein preferred extractants in separating gold and/or palladium from platinum are di-n-octyl sulfide, decylmethyl sulfide or di-n-hexyl sulfide.

The following equations depict what is believed to be the redox mechanism involved in removing the impurity which is believed to cause the emulsion when mixing the organic phase with the platinum group metal solution to be extracted.

(1) $2RS:H \rightarrow 2RS\cdot + 2H^+ + 2e^-$ (2) $2Cu^{++} + 2e^- \rightarrow 2Cu^+$ (3) $2RS\cdot \rightarrow RSSR$ The above reactions represent the half cell reactions of the redox system as well as the condensation of the free radical which is formed by one-half reaction so as to give rise to a disulfide.

The overall reaction may be represented by the formula $2RSH + 2Cu^{++} \rightarrow RSSR + 2H^+ + 2Cu^+$.

An example of a suitable pretreatment is employing di-n-hexyl sulfide diluted with a water immiscible solvent such as an Solvesso ®, an aromatic solvent which is a registered trademark of Esso Chemicals in a 1:1 mixture with the sulfide. The pretreatment process is carried out in the same apparatus that is used to extract palladium and/or gold from the base metals. An equal volume of an acidic aqueous solution of copper chloride (20 grams per liter $CuCl_2$ in three normal HCl) and the solvent diluted di-n-hexyl sulfide is added to the extraction vessel. The two phases are mixed thoroughly for at least 15 minutes and then allowed to separate. The lower aqueous phase is drained off and, if desired, may be saved for future use. The organic phase may then be scrubbed by mixing it thoroughly with a one normal HCl solution. After the phase is separated, the scrub solution is drained off and discarded.

In the preferred embodiment the organic phase is then mixed thoroughly with an aqueous ammonia solution (1:1). After the phase is separated the ammonia solution is drained off and discarded. The organic phase is then mixed with sufficient one normal HCl solution to neutralize the residual ammonia. The acid solution is drained off and discarded. The di-n-hexyl sulfide is now ready to use in the purification in extraction of palladium and/or gold by mixing the purified di-n-hexyl sulfide with an acidic aqueous chloride solution containing the palladium and/or gold to be extracted, allowing the phases to separate and drawing off and discarding or otherwise processing the aqueous phase. The palladium and/or gold is retained in the organic phase. The gold may thereafter be stripped from the organic phase by various techniques as set forth in U.S. Pat. No. 3,985,552.

It is to be understood that the above-described embodiments are simply illustrative of the principles of the invention. Various other modifications and changes may be devised by those skilled in the art which will embody the principles of the invention and fall within the spirit and scope thereof.

What is claimed is:

1. A solvent extraction method for separating palladium and gold metal ions from other metal ions and/or from each other including the steps mixing an aqueous acidic chloride solution containing the metal ions to be extracted with a water immiscible organic phase which includes an organic extractant comprising a thioether having the formula R'—S—R wherein R' and R are organic radicals of the same or different types having a carbon atom bonded to the sulphur (S) atom and separating the aqueous phase from the organic phase, including the step of treating said water immiscible organic phase prior to mixing said phase with the aqueous phase, with an oxidizing agent capable of essentially eliminating any impurity of the type R—S—H from the organic phase wherein R is an organic radical, S is sulphur and H is hydrogen, said oxidizing agent being incapable of oxidizing the thioether.

2. The method recited in claim 1, wherein the extractant is a member of the group consisting of di-n-octyl sulfide, decylmethyl sulfide and di-n-hexyl sulfide.

3. The method recited in claim 2, wherein the extractant is di-n-hexyl sulfide.

4. The method recited in claim 1, wherein the oxidizing agent is in an aqueous solution and wherein such aqueous solution is mixed with the organic phase and then separated therefrom.

5. The method recited in claim 4, wherein the oxidizing agent is a metal ion selected from the group consisting of $Cu^{+2}$ and $Fe^{+3}$ and mixtures thereof.

6. The method recited in claim 5, wherein the aqueous phase of the oxidant is acidic.

7. The method recited in claim 4, wherein the aqueous phase of the oxidant is acidic.

8. The method recited in claim 7, wherein the aqueous phase of the oxidant is acidified with HCl.

9. The method recited in claim 8, wherein the extractant is di-n-hexyl sulfide.

10. The method recited in claim 5, wherein the extractant is di-n-hexyl sulfide.

11. The method recited in claim 1, wherein the oxidizing agent is a metal ion which exhibits more than one ionic valence state, said ion being in a higher valence state.

12. The method recited in claim 11, wherein the aqueous phase of the oxidant is acidic.

13. A solvent extraction method for separating palladium and gold metal ions from other metal ions and/or from each other including the steps mixing an aqueous acidic chloride solution containing the metal ions to be extracted with a water immiscible organic phase which includes an organic extractant comprising a thioether having the formula R'—S—R wherein R' and R are organic radicals of the same or different types having a carbon atom bonded to the sulphur (S) atom and separating the aqueous phase from the organic phase, including the step of treating said water immiscible organic phase prior to mixing said phase with the aqueous phase, with an oxidizing agent capable of essentially eliminating any impurity of the type R—S—H from the organic phase wherein R is an organic radical, S is sulphur and H is hydrogen, said oxidizing agent being incapable of oxidizing the thioether and wherein said oxidizing agent is an aqueous solution of cupric chloride acidified with hydrochloric acid and including the step of mixing the aqueous cupric chloride solution with the organic phase and then separating the two phases.

14. The method recited in claim 13, wherein the extractant is selected from di-n-octyl sulfide, decylmethyl sulfide and di-n-hexyl sulfide.

15. The method recited in claim 13, including washing the cupric chloride treated organic phase with an aqueous ammonia solution, separating the phases and then rinsing the organic phase with a dilute aqueous HCl solution to neutralize any remaining ammonia prior to use of the organic phase for the extraction of the platinum group metals.

16. The method recited in claim 15, wherein the extractant is di-n-hexyl sulfide.

17. The method recited in claim 13, wherein the extractant is di-n-hexyl sulfide.

* * * * *